United States Patent [19]
Sorenson

[11] 3,827,318
[45] Aug. 6, 1974

[54] AUTOMATIC LATHE WITH ROTARY CUTTER

[75] Inventor: Jess Frank Sorenson, Yucaipa, Calif.

[73] Assignee: Sorenson Engineering, Inc., Yucaipa, Calif.

[22] Filed: Mar. 23, 1972

[21] Appl. No.: 237,487

[52] U.S. Cl. ............................ 82/1 C, 29/57, 82/19
[51] Int. Cl. .......................... B23b 1/00, B23b 25/00
[58] Field of Search ............ 90/15, 11 C; 82/18, 19, 82/1 C; 29/57, 37 A

[56] References Cited
UNITED STATES PATENTS

| | | | |
|---|---|---|---|
| 1,531,565 | 3/1925 | Melling | 29/57 X |
| 2,555,616 | 6/1951 | Swartz | 29/57 |
| 2,648,259 | 8/1953 | Kulisic | 29/57 X |

FOREIGN PATENTS OR APPLICATIONS

| | | | |
|---|---|---|---|
| 3,935 | 7/1908 | Great Britain | 29/57 |

Primary Examiner—Andrew R. Juhasz
Assistant Examiner—Z. R. Bilinsky
Attorney, Agent, or Firm—Louis J. Knobbe; Don W. Martens; Gordon H. Olson

[57] ABSTRACT

A sliding headstock automatic lathe includes a cutting tool which rotates in the same direction as the workpiece and at a speed precisely twice that of the workpiece, resulting in two or more flat cuts on the workpiece. The cutting tool is driven from the lathe spindle nose by a drive train which accommodates the relative longitudinal movement of the spindle nose and lateral movement of the cutting tool without slippage.

12 Claims, 7 Drawing Figures

PATENTED AUG 6 1974　　　　3,827,318

AUTOMATIC LATHE WITH ROTARY CUTTER

INTRODUCTION

This invention relates to sliding headstock automatic lathes, and to a rotary cutter accessory for such lathes.

Sliding headstock automatic lathes conventionally include a collet chuck which grips a workpiece and reciprocates to advance the workpiece past a plurality of tools. The tools are selectively moved laterally into contact with the workpiece to perform machinery operations such as turning. In the past turning tools conventionally have had edges which remain stationary, i.e. do not rotate, during the turning operation. Such tools in combination with a rotating workpiece turn parts of circular cross-section, but cannot turn parts of square, or other polygonal cross-sections. Normally rods of polygonal cross-section are available only in certain standard sizes above one-eighth inch, except on special order.

It is known in the patented prior art that a lathe equipped with a cutting tool rotating at twice the speed, and in the same direction, as the workpiece can turn a part of square cross-section. Apparently that prior art technique has not been accepted commercially because the prior art devices were not designed for use on Swiss or sliding headstock lathes. Such lathes have great advantages in turning long slender parts because the tool is always working adjacent a stationary bushing which provides lateral support for the part, while advancing the workpiece to turn a long part. It is generally not practical to turn large quantities of long, very slender small parts with non-sliding headstock machines.

One problem in adapting the rotary cutter to a sliding headstock machine arises from the fact that the headstock and collet which grip and rotate the part moves longitudinally with respect to the tool, and the tool moves laterally with respect to the collet. Nonetheless the collet and rotating tool must be driven from a common drive which positively avoids relative slippage, in order to assure that the ratio of speeds of rotation of the workpiece and the tool is precisely an integer or whole number, such as 2.0. If the ratio of speeds is, for example, 1.99 because of relative slippage, the cutting tool will strike the part at a slightly different point on each revolution and the desired flat surface is not achieved.

In accordance with this invention such a rotary cutter is added to a conventional sliding headstock lathe and a unique drive train is employed to assure the precise desired speed ratio is maintained. In accordance with a second embodiment of this invention, a window is cut in a tubular rod by utilizing a speed ratio of one to one.

The preferred means for practicing this invention will be described below with reference to the accompanying drawings.

BRIEF DESCRIPTION OF DRAWING VIEWS

DESCRIPTION OF PREFERRED EMBODIMENTS

Figure 1:
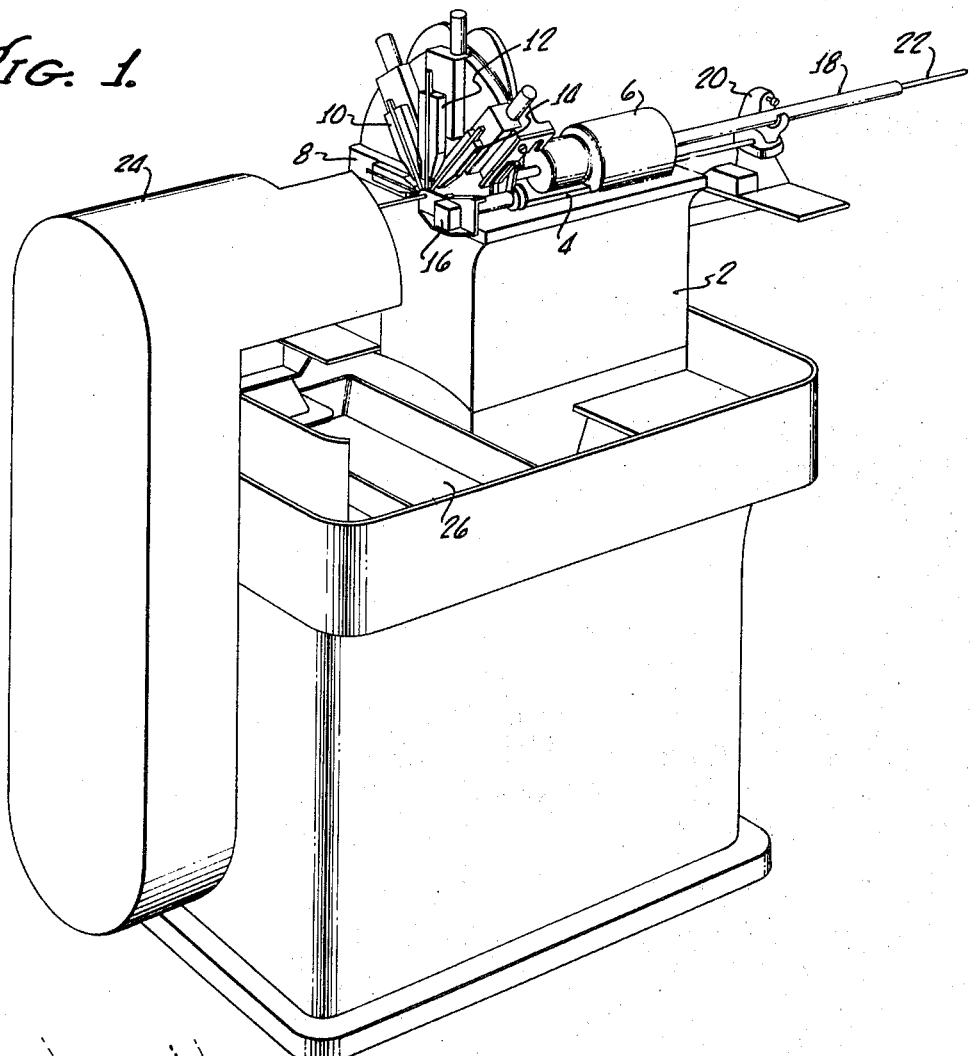
FIG. 1 is a perspective view showing an automatic lathe with a sliding headstock and including a cutting tool in accordance with this invention.

Referring to FIG. 1, the automatic lathe includes a base 2 having mounted thereon a pair of longitudinally extending tracks 4. A headstock 6 is mounted on the tracks 4 for reciprocating movement longitudinally of the base 2. A plurality of tools 8,10,12 14 & 16 are mounted on a vertical support member 17 of the base forward of the sliding headstock. A guide tube 18 extends rearwardly from the headstock and rests on a support 20. A workpiece or rod 22 is extended from the rear through the guide tube 18, through the axis of the sliding headstock 6 and past the tools 8-16. A guard 24 mounted on the base provides a safety shield. A bin 26 for collecting the completed pieces is located below the tools.

Figure 3:
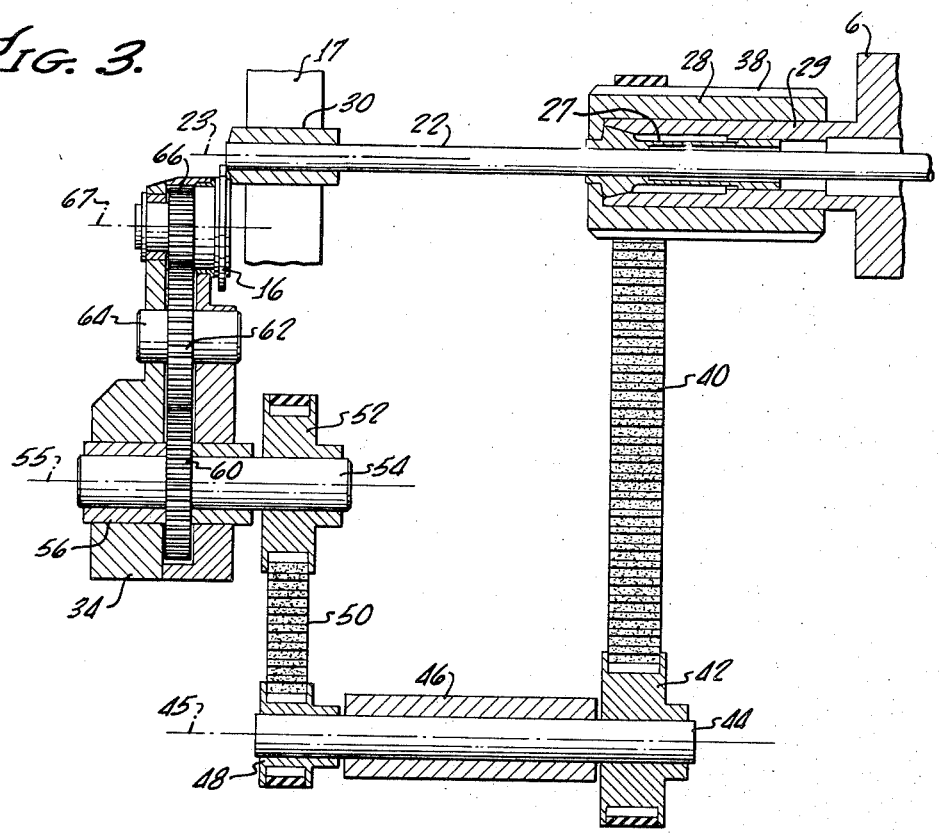
FIG. 3 is a sectional plan view showing the rotating cutting tool and its operative connection to the spindle nose with portions omitted for clarity.
Figure 4:
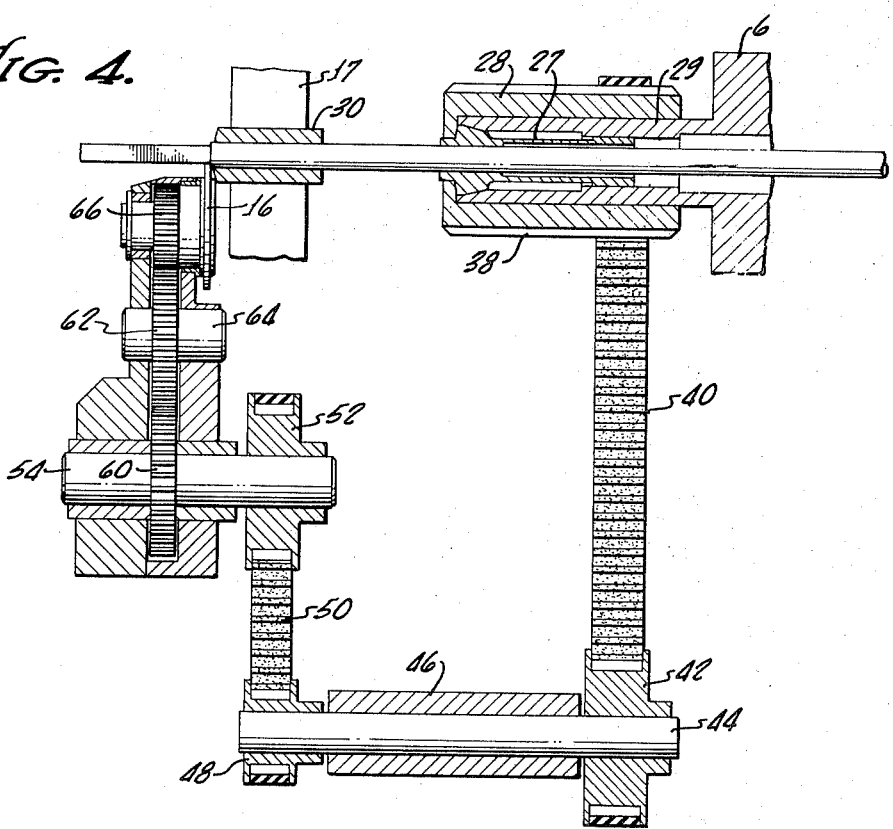
FIG. 4 is a view similar to FIG. 3 but showing the spindle nose in advanced position.

As can be seen from FIGS. 3 & 4, the rod 22 passes through a collet 27 mounted within the spindle nose 28 on the forward end of the headstock spindle 29. The main spindle (not shown) of the lathe is rotated by a drive mechanism (not shown) to rotate the collet 27 and spindle nose 28 together through a conventional positive interconnection. The collet grips the rod 22 and rotates the rod about its axis 23 with the collet. From the collet, the rod extends forward through a support bushing 30 which supports the rod adjacent the tools 8-16. The bushing 30 is fixed to the upright member 17 of the base to provide lateral support against the cutting action.

As noted above the sliding headstock is mounted for reciprocation on the tracks 4. A power driven cam (not shown) controls reciprocation of the headstock. FIG. 3 shows the spindle nose 28 and headstock 6 in the rear or retracted position and FIG. 4 shows the same elements in the advanced or forward position. The rod is gripped in the collet during advance of the headstock so that the rod is advanced past the tools in addition to being rotated. The rod is released by the collet in a conventional manner as the headstock retracts and the rod is held against retraction with the headstock by conventional means.

Each of the tools 8-16 is mounted for lateral movement transverse of the rod 22 for selective operative engagement to machine the rod. The lateral movement of the tools is controlled in conventional manner by cams (not shown) in the base.

All of the above, except for tool 16 is known in the art and may be any conventional automatic lathe with sliding headstock, such as Bechler Model AR-10, manufactured by Andre Bechler Ltd., Moutier, Switzerland.

Figure 5:
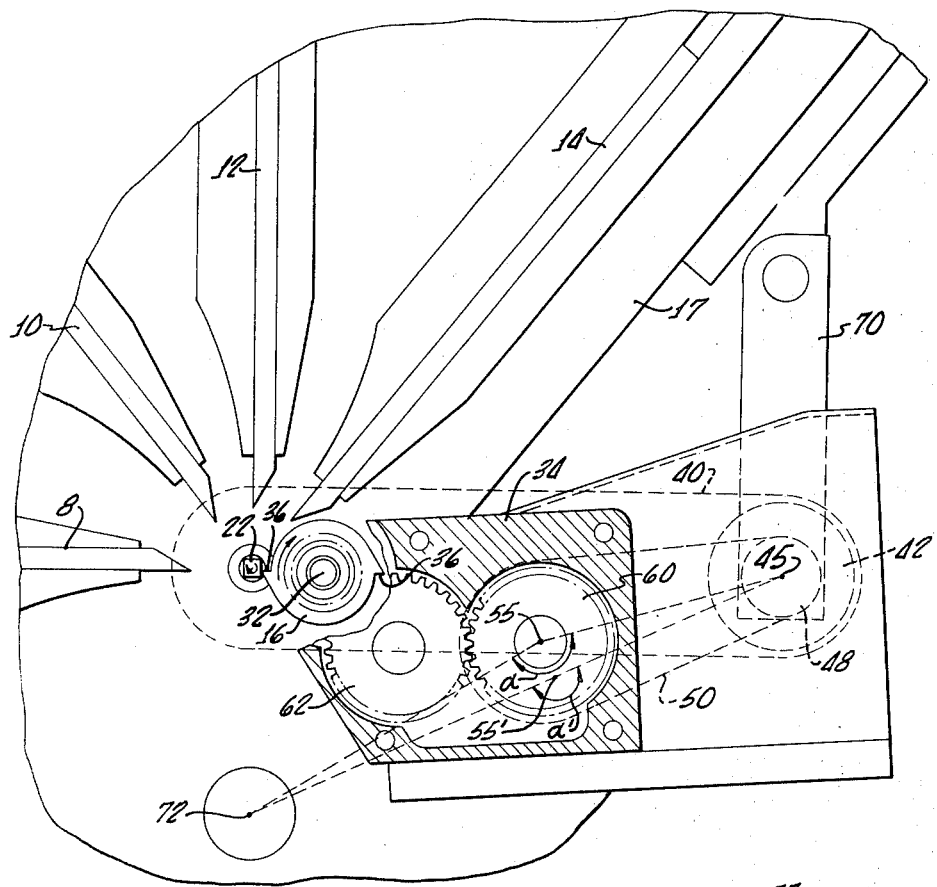
FIG. 5 is a partial elevation view showing the rotating cutting tool with portions in section and portions removed for clarity.

As shown in FIG. 5, the tool 16 is mounted for rotation about an axis 32 on a holder 34. The rotating tool 16 includes two cutting edges 36 spaced by 180° around the cutting tool and adapted to cut the rod 22.

Figure 2:
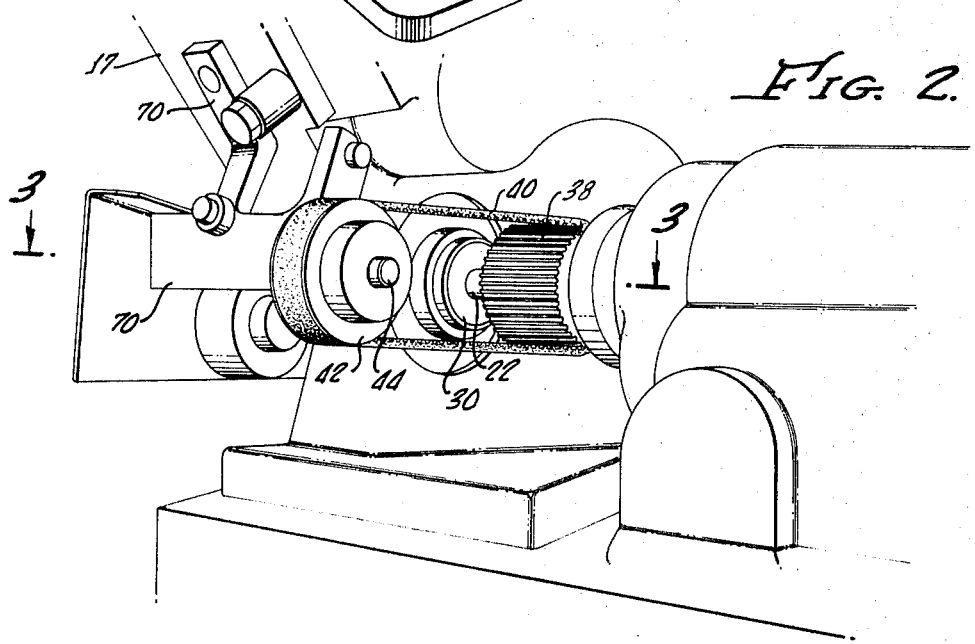
FIG. 2 is an enlarged perspective view showing a portion of the drive mechanism for the rotary cutting tool.

Referring now primarily to FIG. 3, but also to FIGS. 2 and 5, the spindle nose 28 has radially disposed gear teeth 38 formed on its exterior. A toothed timing belt 40 is engaged with the spindle nose gear teeth 38 and with a pulley or gear 42 fixed to the rear end of a shaft 44 which rotates about an axis 45 in a bushing 46 fixed on the base. A gear 48 fixed on the forward end of the shaft 44 is engaged by a toothed timing belt 50 which also engages another gear 52 disposed inward of the gear 48. The gear 52 is fixed on a shaft 54 which is mounted for rotation about an axis 55 in a bushing 56 on the tool holder 34. Also fixed on the shaft 54 is a gear 60 which meshes with an idler gear 62 rotatably mounted on the holder 58 by a shaft 64. The idler gear 62 in turn meshes with an output gear 66 which is fixed on the tool 16 for rotation together about the axis 67 in the tool holder.

Therefore, the rotating spindle nose which rotates the collet also positively rotates the gear 42 through the timing belt 40. The shaft 44 fixed to the gear 42 rotates the gear 48 which through the timing belt 50 positively rotates the gear 52. The gear 52 through the shaft 54 rotates the gear 60 which through the idler gear 62 rotates the output gear 66 and the cutting tool 16. Therefore, the drive mechanism from the collet to the cutting tool is positive and avoids any slippage. Through the relationship it can be assured that the cutting tool will rotate in the same direction as the rod and at precisely the desired rate; in the preferred example 2.0 times the speed of rotation of the collet and rod.

The gear 38 formed on the exterior of the spindle nose 28 is of substantial length. As shown in FIG. 3 and 4, the spindle nose 28 advances toward the cutting tool 16 during operation, but the cutting tool 16 and all of the remaining elements 40-66 of the cutting tool drive train are fixed against longitudinal movement relative to the base. As the spindle nose advances, however, it slides longitudinally relative to the toothed timing belt 40 to permit the spindle nose to move forward while still maintaining the desired driving relationship with the pulley.

Referring now to FIGS. 2 and 5, the gear 42, shaft 44 and gear 48 are mounted for rotation in a bracket 70 which is rigidly connected to the upright member 17 of the base, and therefore fixed against longitudinal or lateral movement relative to the base. The holder 34, on the other hand is mounted in a conventional manner for pivoting movement about an axis 72 on the lathe under the control of a cam (not shown). The cam causes the holder 34 to pivot slightly clockwise from the advanced position shown in FIG. 5 to retract the cutting tool from the workpiece and back counterclockwise to the position shown in FIG. 5 to advance the cutting tool into cutting relationship with the workpiece. When the tool is in the retracted position the axis 55 of the gear 60 is moved to the position 55'. In order to minimize the amount of belt slackening during pivoting of the holder, preferably, when the holder is fully retracted the angle α' from axis 72 through axis 55' to axis 45 is about 180° ± 10°. In the preferred embodiment illustrated, α ' is exactly 180°. When the holder is advanced the angle α from axis 72 through axis 55 to axis 45 is less than, but close to 180°. That relationship minimizes the change in distance between axes 45 and 55 and therefore between gears 48 and 60 as the holder advances and retracts the tool since the movement of the axis 55 is substantially perpendicular to the line between the axes 45 and 55. The slight variation in distance between the two axes 45 and 55 during advance and retraction of the tool can be accomodated by slackening and tightening of the timing belt 50 without disengagement of the belt from the gears 48 and 60. In addition, pivoting of the holder counterclockwise about the axis 72 to advance the tool tightens, rather than loosens, the belt 50 so that the belt is at its tightest position when in the operative or cutting position.

Figure 6:
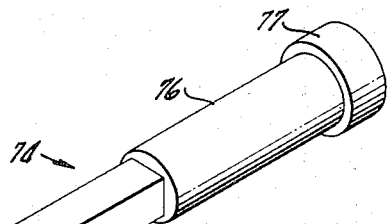
FIG. 6 is a perspective view of a piece turned with the cutting tool of this invention.

As shown in FIG. 6, the piece 74 resulting from operation of the rotating cutting tool may have an elongated portion 75 of square cross-section and, for example, two other cylindrical portions 76, 77 of varying diameter made with two of the tools 8–14. The piece was cut from the rod using yet another of the tools 8–14. The exemplary piece 74 can be of any length or size, but by way of example the piece shown in FIG. 6 might be ½ inch long and 0.025 inch wide on each side of the square cross-section portion. Thus, it can be seen that use of the rotating cutting tool of this invention in combination with a sliding headstock machine permits the machining of very small parts which are relatively long in comparison with their cross-section because of the support given to the piece by the bushing 30 as the rod 22 is advanced past the tool 16.

It should be understood that in accordance with this invention it is possible to achieve different shapes by varying the number of cutting edges on the cutting tool and varying their placement around the cutting tool. For example, the two cutting edges 180° apart as shown in FIG. 5 result in a square shape, or in a rectangular shape if the cutting edges are differing distances from the axis of the cutting tool. A single cutting edge would result in only two flat sides on the piece, whereas three cutting edges spaced at 120° would provide a hexagonal shape. Other variations, such as diamonds and other polygons, can be achieved with other numbers of edges and differing circumferential displacements. Further, pyramid and other tapered shapes can be achieved by varying the depth of cut, i.e. the amount of advance of the cutting tool, as the rod advances.

Figure 7:
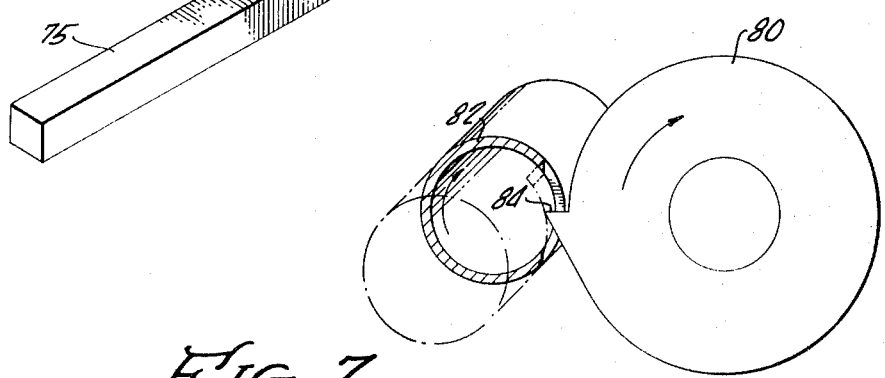
FIG. 7 is a section view illustrating another embodiment of this invention.

Further, in accordance with an embodiment of this invention shown in FIG. 7, the cutting tool 80 may be rotated at precisely the same rate as the rod 82 and include only a single cutting edge 84 thereby merely cutting one side of the rod. As can be seen in FIG. 7, this exemplary rod is tubular with a bore 86 through its center and the rotating cutting tool 80 cuts only a window 86 through one side of the rod into that interior bore. The cut with the 1:1 rotational ratio is not flat, as with the 2:1 ratio, and instead is always slightly convex. The degree of convexity is related to the relative diameters of the rod and the cutting tool. The convexity requires greater undertool cutting clearance, but has been found to be quite practical.

Another problem in adapting the rotary cutter to a sliding headstock machine is the close proximity of the various tools which limit the diameter of the cutter and create interference problems. The design and location of the cutter described above overcome those problems as will be evident from the above description.

I claim:

1. A lathe comprising:
   a base;

headstock means mounted on said base for reciprocating movement longitudinally of the base;
collet means on said headstock for gripping a rod;
drive means for rotating said collet and rod;
a rotatable cutting tool mounted on said base;
feed means for reciprocating said headstock means to advance said rod past said tool as said rod rotates; and
means connecting said tool and said drive means for rotating said tool at precisely an integer ratio ralative to the rate of rotation of said rod.

2. A lathe in accordance with claim 1 and further comprising:
means for moving said tool laterally toward and away from said rod.

3. A lathe in accordance with claim 1 wherein said tool rotates at two times the rate of said rod and in the same direction as said rod.

4. A lathe in accordance with claim 3 wherein said tool includes two cutting edges spaced apart by 180°.

5. A lathe in accordance with claim 1 wherein said tool rotates at the same rate and in the same direction as said rod.

6. A lathe in accordance with claim 1 wherein said connecting means includes:
pulley means surrounding said collet and positively connected for rotation therewith.

7. A lathe in accordance with claim 6 wherein said collet pulley means is a gear means, and said connecting means further comprises:
second gear means rotatable about a shaft parallel to the collet axis and fixed against longitudinal translation along the base; and
timing belt means driving said second gear means from said collet gear means, said collet gear means having sufficient longitudinal dimension to accommodate the reciprocation of the headstock.

8. A lathe in accordance with claim 6 and further comprising:
second pulley means rotatable about a shaft parallel to the collet axis and fixed against lateral movement relative to the base;
belt means operatively connecting said collet pulley and said second pulley;
holder means rotatably mounting the cutting tool, and mounted for pivotal movement on said base about an axis parallel to the collet axis for advancing and retracting the cutting tool;
third pulley means rotatably mounted on said holder and operatively connected to rotate said cutting tool; and
second belt means operatively connecting said second and third pulley means.

9. A lathe in accordance with claim 8 wherein said pulley means are gears and said belt means are toothed timing belts.

10. A lathe in accordance with claim 8 wherein the angle from the second pulley axis through the third pulley axis to the pivot axis of the holder is about 180°.

11. A lathe in accordance with claim 1 and further comprising:
bushing means forward of said collet means and immediately rearward of said cutting tool, fixed against longitudinal and lateral movement relative to said base and supporting the rotating and advancing rod adjacent the tool.

12. A method of cutting a window in a tubular rod having a radius at least several times larger than its wall thickness comprising:
rotating said rod about its longitudinal axis;
contacting said workpiece with a cutting tool while rotating said tool in the same direction as said rod is rotated about an axis generally parallel to said axis of rotation of the rod and at precisely the same rate of rotation to cut a window in said rod the cut surfaces of which are slightly convex.

* * * * *